United States Patent [19]

Tonutti

[11] Patent Number: 5,231,829
[45] Date of Patent: Aug. 3, 1993

[54] RAKE TROLLEY WITH ADJUSTABLE WORKING WIDTHS SUITABLE FOR FINGER WHEEL HAY RAKES

[75] Inventor: Carletto Tonutti, Tricesimo, Italy

[73] Assignee: Tonutti S.p.A., Italy

[21] Appl. No.: 774,712

[22] Filed: Oct. 9, 1991

[30] Foreign Application Priority Data

Jul. 19, 1991 [IT] Italy ............................ UD91U000029

[51] Int. Cl.$^5$ ................................................ A01D 78/14
[52] U.S. Cl. .............................................. 56/377; 56/396
[58] Field of Search ............... 56/15.9, 16.1, 14.9, 56/377, 38, DIG. 21, 367, 350, 378, 379, 341, 365, 396

[56] References Cited

U.S. PATENT DOCUMENTS

| | | | |
|---|---|---|---|
| 4,183,198 | 1/1980 | Sligter | 56/377 |
| 4,245,458 | 1/1981 | Smith | 56/377 |
| 4,974,407 | 12/1990 | Rowe et al. | 56/377 |
| 4,977,734 | 12/1990 | Rowe et al. | 56/15.9 |

*Primary Examiner*—Stephen J. Novosad
*Attorney, Agent, or Firm*—Andrus, Sceales, Starke & Sawall

[57] ABSTRACT

The present invention regards a rake trolley with adjustable working widths, suitable for three point hitch finger wheel hay rakes. The trolley includes a transverse frame member. A pair of rake arms are connected to a pair of moveable heads, and a pair of hydraulic cylinders are provided for moving the moveable heads between a working position in which the rake arms are lowered, and a transport position in which the rake arms are raised. The rake heads are mounted to the frame member, and the position of the rake heads on the frame member can be adjusted to vary the overall width of the rake trolley.

7 Claims, 5 Drawing Sheets

RAKE TROLLEY WITH ADJUSTABLE WORKING WIDTHS SUITABLE FOR FINGER WHEEL HAY RAKES

BACKGROUND OF THE INVENTION

The present invention regards a rake trolley with adjustable working widths suitable for three point hitch finger wheel rakes characterized by the fact that the trolley is suitable for the majority of hay rakes having a standard international three point hitch. Two hay rakes can be assembled onto this trolley without further modifications, devices or adapting clamps.

Furthermore, the structure in a working phase can be regulated to different widths without having to modify the optimal angle of inclination of the two rakes, allowing the rake wheels to always have a gentle contact with the forage to be harvested. This aspect of the invention drastically reduces the loss of leaves and thus improves remarkably the nutritive value of the forage. The trolley includes two moveable heads (right hand and left hand) that slide on the main frame towards the inside and outside, which allow an operator to modify the working width of the machine, modifying at the same time, in equal measurement, the formation of the back row without modifying the inclination of the two hay rakes.

The two moveable heads, able to support hay rakes with a standard international three point hitch, are actioned by two hydraulic cylinders that allow the rotation on a pivot of the two hay rakes from a working position (lowered) to a transport position (lifted) thus avoiding waste of time on the operator's behalf who does not have to intervene manually, as happens in other known implements, to modify the positions of the two hay rakes.

The cylinders that rotate the two moveable heads can be used in four different ways 1) Single hydropneumatic effect with single action as per FIG. 1; 2) Single hydropneumatic effect with double action as per FIG. 2; 3) Double effect single action as per FIG. 3; 4) Double effect double action as per FIG. 4.

This feature allows the maximum flexibility in the use of the two hay rakes which can be adapted onto all types of tractors, from simple, older tractors with only one hydraulic connector (FIG. 1) or on the more modern tractors with four hydraulic connectors (FIG. 4).

The rake trolley has been designed so as to make it easy to disassemble and to reduce to a minimum its space volume, a very important factor in the cost of transport and in particular for the shipping of containers.

At the present state of technology, fixed rakes exist (assembled on structures and carried on three point hitch on the tractor or on trolleys always attached to the tractor) and other variable parallelogram structures (assembled on wheels) keeping the carrying structure parallel to the ground.

The present invention overcomes the structural complexity of the existing implements with a structure that is simple to carry out and is also of a simple composition.

The rake trolley (which carries from 2 to 6 wheel rakes on each side) has a central drawbar, two rake head supports, one on each side, which are each actioned by an oleodynamic (hydraulic) cylinder on which one places the finger wheel hay rakes.

The rake head supports are orientable in the space there is (registered by hand) and directly actioned with the oleodynamic cylinders with the aid of the tractor.

In a working position, the rake wheels take up a large amount of space on the right hand and left hand side, which can be registered with its proper rods and mechanical clamps, while in a transport position, the geometrical configuration varies from the working position to an oblique lifted position reducing the side space.

One of the main aspects of the present invention is its ability to vary the width of the carriage and consequently the moveable heads which support the hay rakes. This allows for one to adapt the height on the basis of the width of the windrow (whose width has been determined by the mower) improving its performance.

As an option to the invention, one can add to the drawbar, an arm carrying rake wheel that works in the middle of the two side rakes. This is to improve the result of work of the machine in particular for the central part which is not taken care of with the side rakes.

BRIEF DESCRIPTION OF THE DRAWINGS

The rake trolley with adjustable working widths will be better described with the help of the enclosed drawings which carry three embodiments of the invention.

In the drawings.

DETAILED DESCRIPTION OF THE INVENTION

Figure 1:
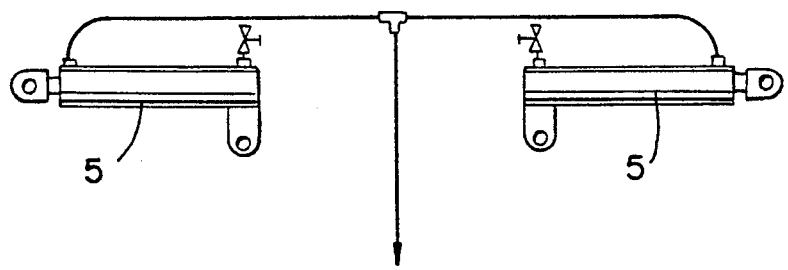
FIGS. 1–4 show various arrangements for actuating the hydraulic cylinders for rotating the moveable heads of the trolleys as summarized above.
Figure 2:
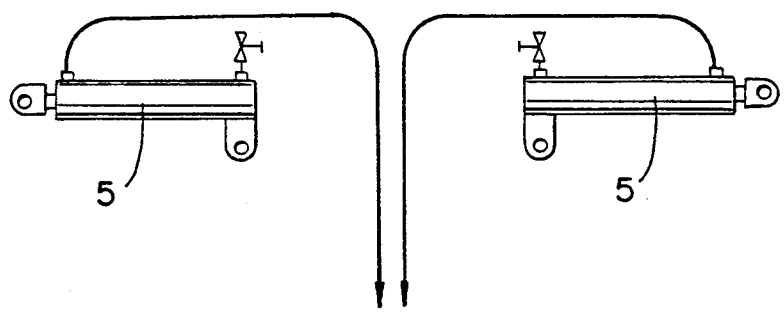
Figure 3:
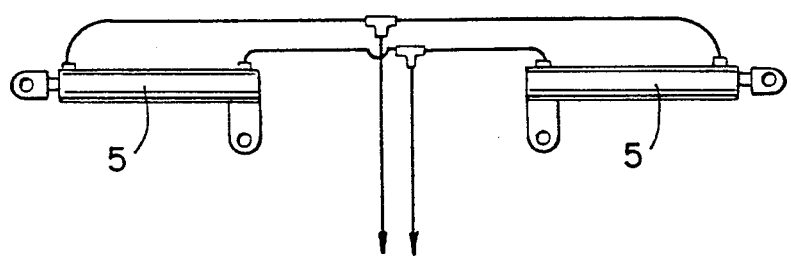
Figure 4:
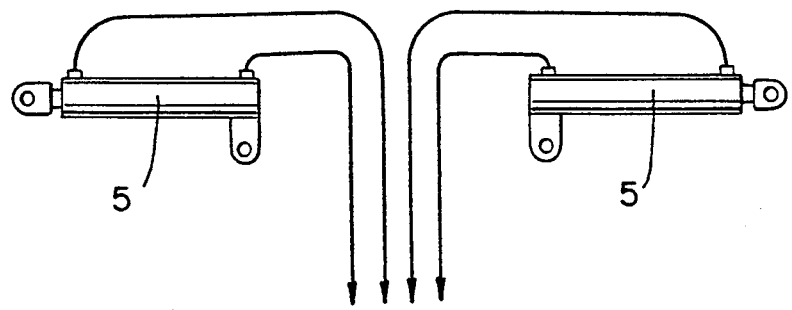
Figure 5:
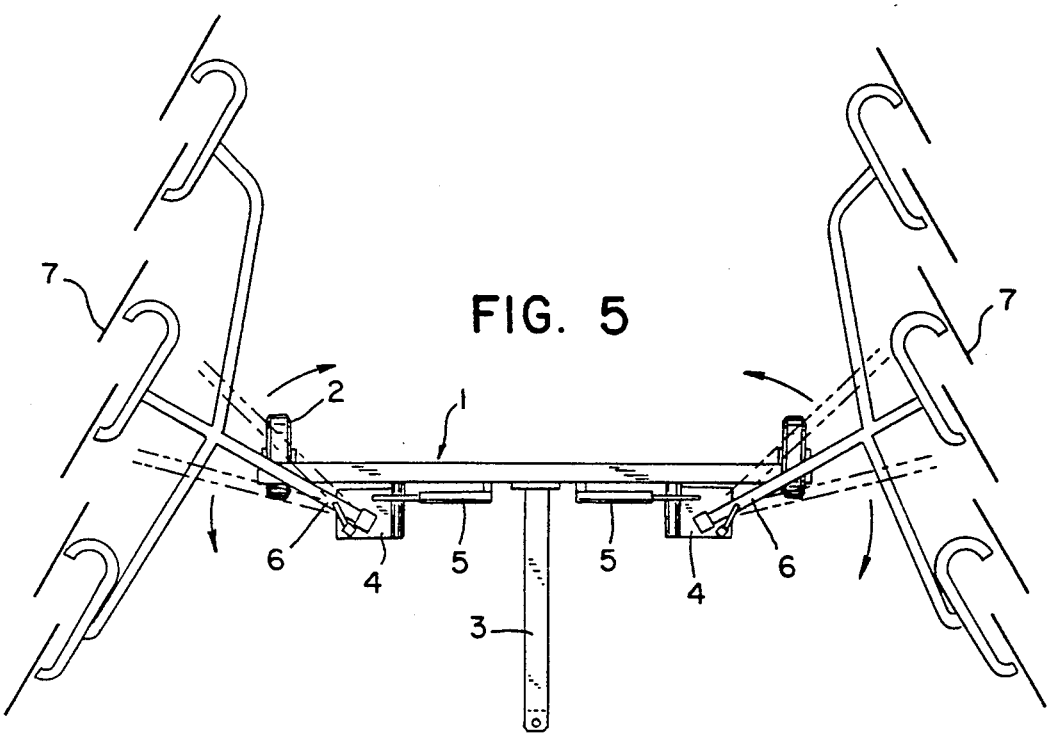
FIG. 5 and 6 are respectively a top and front view of the trolley with the rake wheels in a lowered position which is the working position.
Figure 6:
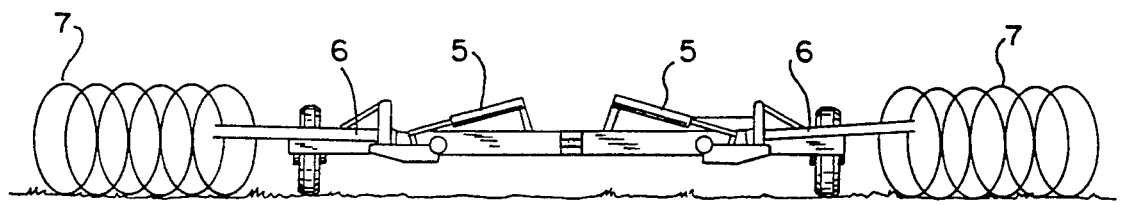
Figure 7:
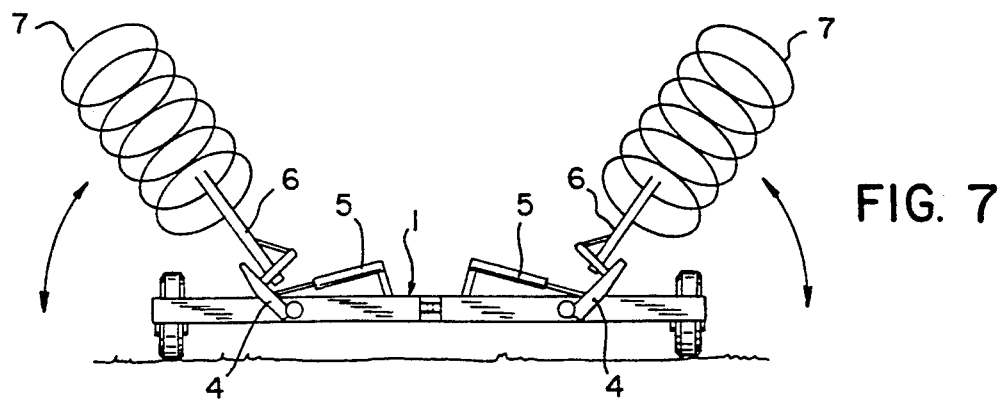
FIG. 7 is a front view of the trolley as per FIG. 6 but with the rake wheels lifted, in a transport position, by actioning the oleodynamic cylinders.

The first version (FIGS. 5–7) shows a trolley with the structure of the side rake wheels (7), which can be completely disassembled. The frame (1) consists of a bar with two pneumatic tires one on each side (2), towed by a tractor by means of a drawbar (3). On the bar frame, on the right hand and left hand side are the moveable heads (4) which are actioned one at a time by oleodynamic cylinders (5). On each moveable head there is an arm or frame (6) which carries the rake wheels (7).

Figure 8:
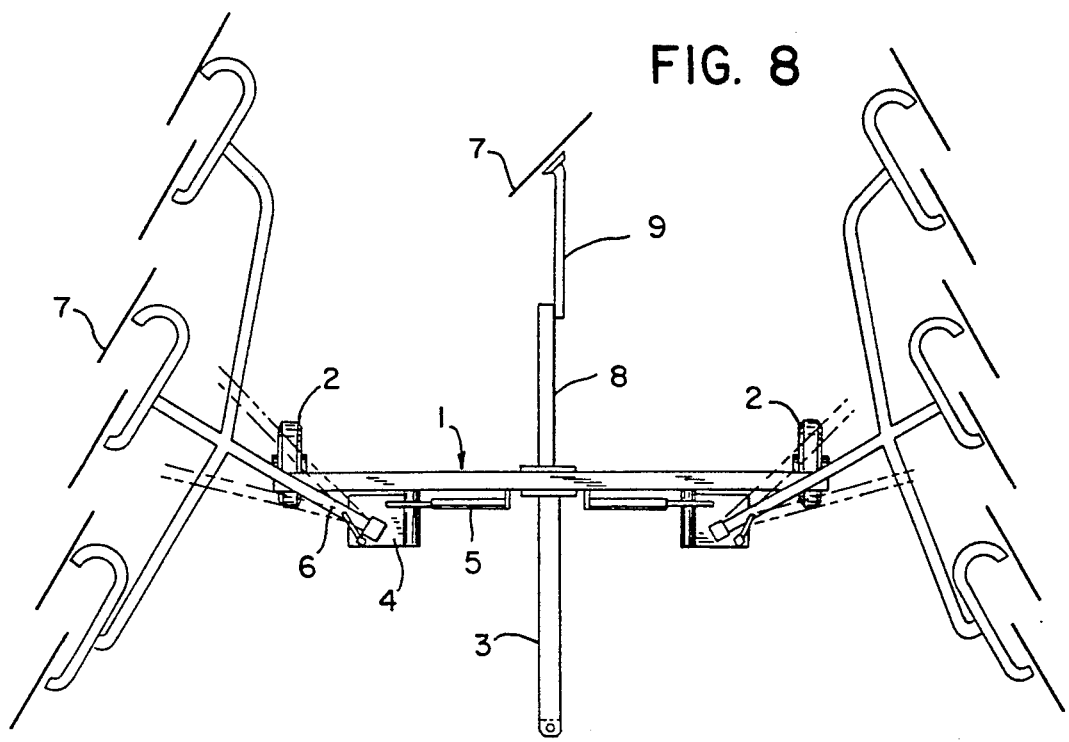
FIG. 8 and 9 are respectively a top and front view of the trolley in the second version, with the supporting structure for the central wheel.
Figure 9:
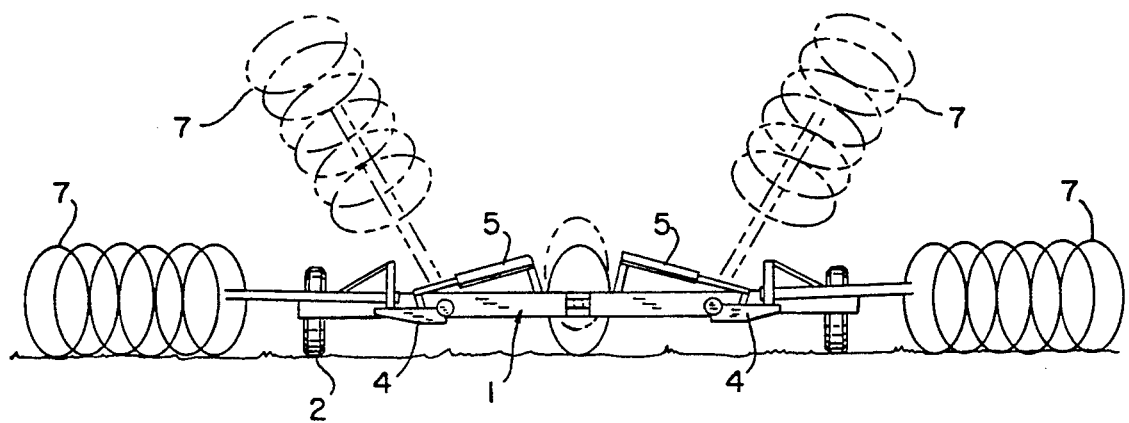
Figure 10:
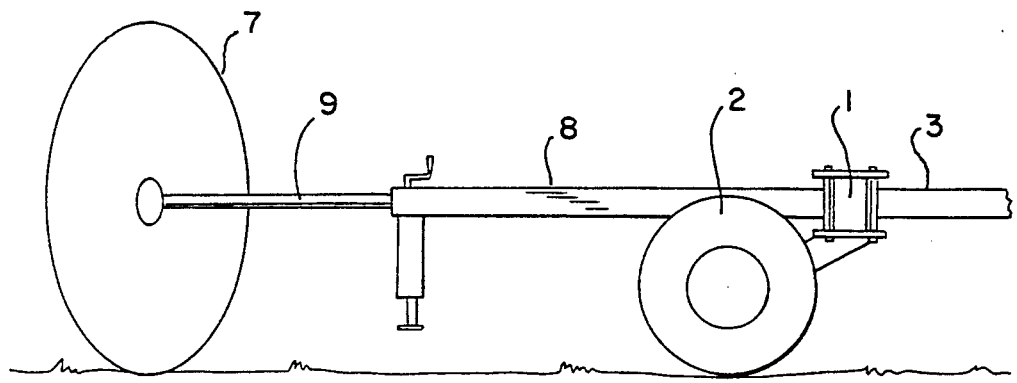
FIG. 10 is a partial side view of the rake emphasizing the central wheel and its supporting arm.

In the second version (FIGS. 8–10), all is as above with a central arm (8) on which an extension (9) has been fitted to carry the rake wheel (7).

In this version, the central wheel moves the hay and grass which has been cut in the center, which would not be touched by the side rake wheels. This central wheel is lifted from the ground in synchrony with the lifting of one of the two side rakes (e.g. with the left hand side with a steel rod or other part suitable to lift).

The moveable heads, other than regulating manually for the right side position, are lifted into an oblique position by oleodynamic cylinders thus reducing the space taken up by the rakes on the sides.

In the third solution (FIGS. 11, 12), the rake trolley has a tubular frame (1) on which the ground wheel supports have been fixed (11) and also the supports for the moveable heads (4) one right hand and one left hand. These supports can be adjusted for the width along the whole frame, thus regulating the working width of the rake wheels.

Figure 11:
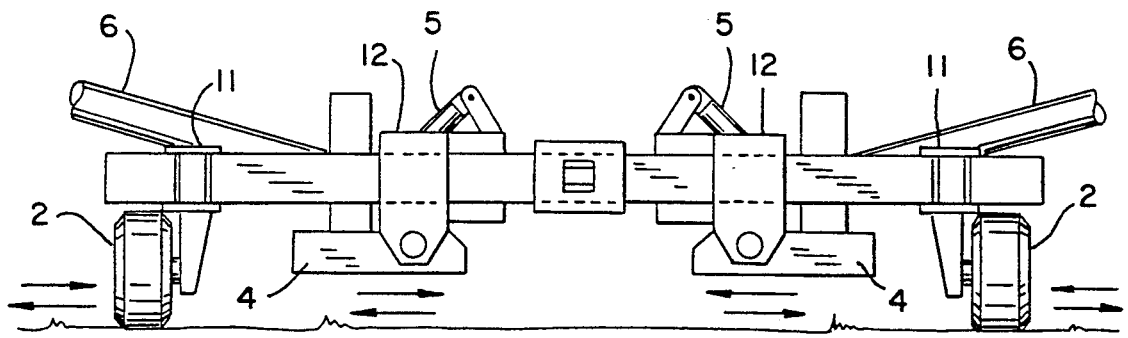
FIG. 11 and 12 represent respectively a front and top view of the third version of the rake trolley showing the main characteristics of the main frame that supports the heads which can be adjusted in the width on the whole frame.
Figure 12:
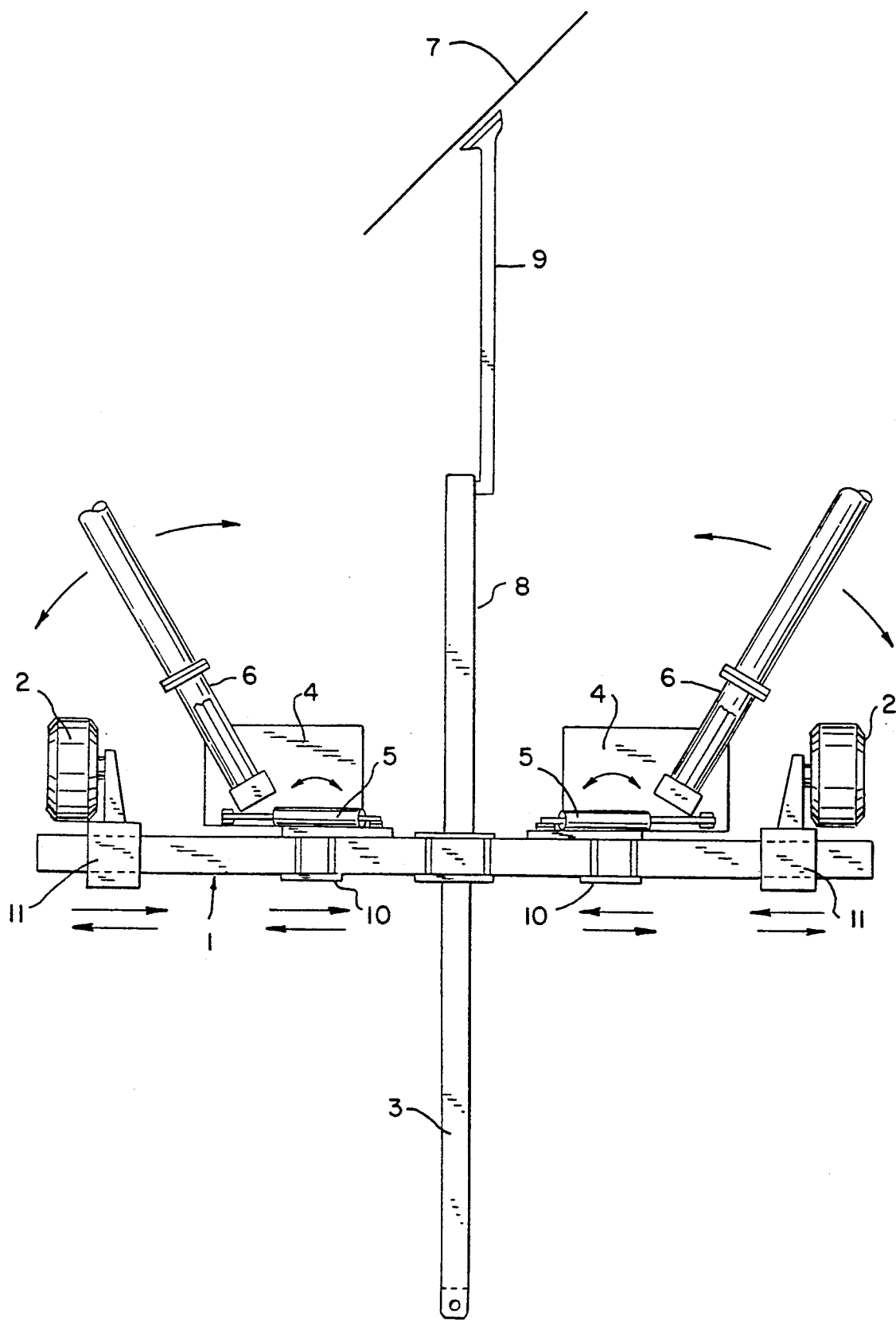

Each support includes a pair of plates located one against the forward surface of the frame (1) and the other against the rearward surface of the frame (1). The plates are connected to each other by a series of bolts which act to clamp the plates onto the frame (1) in a desired position along the length of the frame (1). As shown in FIGS. 11 and 12, the head (4) to which the rake frame (6) is mounted, is pivotably mounted to the forward plate of the support. The cylinder (5) is mounted to the rearward plate, and its rod is connected to the head (4).

In this case (FIG. 12) the central rake wheel is also shown.

The possibility to adjust the width of the moveable heads can also, be applied on the first two versions by replacing the support which has been fixed or welded to the frame with moveable supports.

It is well understood that this trolley is not limited to the examples carried here in. On the basis of this machine one can provide other shapes, other ways of production and the particulars used can be modified without changing the results obtained with this rake trolley.

I claim:

1. A rake trolley, comprising:
   a transverse frame member,
   a pair of rake assemblies each including a plurality of rotatable rakes and a rake arm having an inner end and an outer end to which the plurality of rakes are mounted;
   a mounting arrangement for mounting each rake assembly to the transverse frame member, the mounting arrangement being connected to the frame member by means of an adjustable connection assembly moveable to varying locations on the frame member for providing adjustability in the position of the rake assembly relative to the frame member, the mounting arrangement including a pair of plates disposed on opposite sides of the frame member;
   a head mounted to one of the plates of each rake assembly mounting arrangement, wherein the inner end of each rake arm is connected to one of the heads, and wherein each head includes a planar member pivotably mounted to one of the plates of one of the rake assembly mounting arrangements, each planar member being pivotable between a lowered position in which the rake assembly is in a work position and a raised position in which the rake assembly is in a transport position; and
   selectively actuable means connected to each planar member for moving each head between its raised and lowered positions.

2. The rake trolley of claim 1, wherein the selectively actuable means comprises an extendible and retractable hydraulic cylinder assembly connected between the planar member and the plate to which the head is pivotably mounted.

3. The rake trolley of claim 1, further comprising a pair of wheels for supporting the frame member above the ground, and a wheel mounting arrangement interposed between each wheel and the frame member for mounting the wheels to the frame member, the wheel mounting arrangement being moveable to varying locations on the frame member for providing adjustability in the position of the wheels relative to the frame member.

4. A rake trolley, comprising:
   a transverse frame member,
   a pair of rake assemblies each including a plurality of rotatable rakes and a rake arm having an inner end and an outer end to which the plurality of rakes are mounted;
   a mounting arrangement for mounting each rake assembly to the transverse frame member, the mounting arrangement being connected to the frame member by means of an adjustable connection assembly moveable to varying locations on the frame member for providing adjustability in the position of the rake assembly relative to the frame member, the mounting arrangement including a pair of plates disposed on opposite sides of the frame member, wherein the pair of plates are arranged relative to the frame member such that a first one of the plates is located adjacent a forward surface of the frame member and a second one of the plates is located adjacent a rearward surface of the frame member;
   a head mounted to one of the plates of each rake assembly mounting arrangement, wherein the inner end of each rake arm is connected to one of the heads, and wherein each head is movably mounted to one of the plates of one of the rake assembly mounting arrangements, between a lowered position in which the rake assembly is in a work position and a raised position in which the rake assembly is in a transport position; and
   selectively actuable means for moving each rake head between its raised and lowered positions.

5. The rake trolley of claim 4, wherein the head is pivotably mounted to the first plate and the hydraulic cylinder assembly is interposed between the head and the second plate.

6. A rake trolley, comprising:
   a transverse frame member,
   a pair of rake assemblies each including a plurality of rotatable rakes and a rake arm having an inner end and an outer end to which the plurality of rakes are mounted;
   a mounting arrangement for mounting each rake assembly to the transverse frame member, the mounting arrangement being connected to the frame member by means of an adjustable connection assembly moveable to varying locations on the frame member for providing adjustability in the position of the rake assembly relative to the frame member, the mounting arrangement including a pair of plates disposed on opposite sides of the frame member;
   a head mounted to one of the plates of each rake assembly mounting arrangement, wherein the inner end of each rake arm is connected to one of the heads, and wherein each head is movably mounted to one of the plates of one of the rake assembly mounting arrangements, between a lowered position in which the rake assembly is in a work position and a raised position in which the rake assembly is in a transport position;

selectively actuable means for moving each rake head between its raised and lowered positions; and a rearwardly extending arm connected to the frame member adjacent its center and a rake rotatably mounted to the rearwardly extending arm.

7. The rake trolley of claim 6, wherein the rearwardly extending arm is interconnected with one of the rake assemblies such that movement of the rake assembly to its transport position causes lifting of the arm.

* * * * *